United States Patent
Zhu et al.

(10) Patent No.: US 11,632,159 B2
(45) Date of Patent: **\*Apr. 18, 2023**

(54) ENCODING REFERENCE SIGNAL RECEIVED POWERS

(71) Applicant: Lenovo (Beijing) Limited, Beijing (CN)

(72) Inventors: Chenxi Zhu, Fairfax, VA (US); Hongmei Liu, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,010

(22) Filed: Oct. 25, 2021

(65) Prior Publication Data
US 2022/0052741 A1   Feb. 17, 2022

Related U.S. Application Data

(63) Continuation of application No. 16/638,386, filed as application No. PCT/CN2017/097223 on Aug. 11, 2017, now Pat. No. 11,159,223.

(51) Int. Cl.
*H04B 7/06* (2006.01)

(52) U.S. Cl.
CPC ......... *H04B 7/0641* (2013.01); *H04B 7/0626* (2013.01); *H04B 7/0658* (2013.01)

(58) Field of Classification Search
CPC .. H04B 17/318; H04B 7/0632; H04B 17/327; H04B 7/0641; H04B 7/0645;
(Continued)

(56) References Cited

U.S. PATENT DOCUMENTS 10,848,232 B2 *  11/2020  Pan ................. H04W 24/10
11,159,223 B2 *  10/2021  Zhu ................. H04B 7/0641
(Continued)

FOREIGN PATENT DOCUMENTS

CN   101394213 A   3/2009
CN   103517308 A   1/2014
(Continued)

OTHER PUBLICATIONS

3GPP, "3rd Generation Partnership Project; Technical Specification Group Radio Access Network; Study on Scenarios and Requirements for Next Generation Access Technologies; (Release 14)", 3GPP TR 38.913 V14.3.0, Jun. 2017, pp. 1-39.
(Continued)

*Primary Examiner* — Sophia Vlahos
(74) *Attorney, Agent, or Firm* — Kunzler Bean & Adamson

(57) ABSTRACT

Apparatuses, methods, and systems are disclosed for encoding reference signal received powers. One apparatus includes a processor that: determines a reference signal received power corresponding to each beam of multiple beams to result in a set of determined reference signal received powers; orders the set of determined reference signal received powers in descending order to result in an ordered list of reference signal received powers; and encodes a difference between each two adjacent reference signal received powers of the ordered list of reference signal received powers to result in an encoded ordered list of reference signal received powers.

20 Claims, 5 Drawing Sheets

(58) Field of Classification Search
CPC .. H04B 7/0658; H04B 7/0636; H04B 7/0626; H04B 7/0647; H04W 24/10; H04L 1/0009; H04L 1/0029
See application file for complete search history.

(56) References Cited

U.S. PATENT DOCUMENTS

| | | |
|---|---|---|
| 2010/0062779 A1 | 3/2010 | Bienas et al. |
| 2010/0227561 A1 | 9/2010 | Chakraborty et al. |
| 2012/0183093 A1 | 7/2012 | Zhu |
| 2012/0195264 A1 | 8/2012 | Taoka et al. |
| 2018/0219664 A1 | 8/2018 | Guo et al. |
| 2019/0007946 A1 | 1/2019 | Yerramalli et al. |
| 2019/0200249 A1 | 6/2019 | Yoon et al. |

FOREIGN PATENT DOCUMENTS

| | | |
|---|---|---|
| WO | 2015171055 A1 | 11/2015 |
| WO | 2016210302 A1 | 12/2016 |
| WO | 2018085601 A1 | 5/2018 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0, Jun. 2017, pp. 1-745.

3GPP, "3rd Generation Partnership Project; Technical Specification Group Radio Access Network; Evolved Universal Terrestrial Radio Access (E-UTRA); Requirements for support of radio resource management (Release 14)", 3GPP TS 36.133 V14.4.0, Jun. 2017, pp. 1-2582.

Spreadtrum Communications, "Differential RSRP report for beam management", 3GPP TSG RAN WG1 NR Ad-Hoc#2 R1-1710361, Jun. 27-30, 2017, pp. 1-5.

Lenovo, Motorola Mobility, "Discussion of RS for DL beam management", 3GPP TSG RAN WG1 NR Ad-Hoc#2 R1-1710595, Jun. 27-30, 2017, pp. 1-3.

\* cited by examiner

ENCODING REFERENCE SIGNAL RECEIVED POWERS

CROSS REFERENCE TO RELATED APPLICATIONS

This application is a continuation of application Ser. No. 16/638,386 filed on Feb. 11, 2020, which is hereby incorporated by reference in its entirety.

FIELD

The subject matter disclosed herein relates generally to wireless communications and more particularly relates to encoding reference signal received powers.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, RSRP may indicate a strength of a received signal. In such networks, reporting RSRP may consume a large amount of resources.

BRIEF SUMMARY

Apparatuses for encoding reference signal received powers are disclosed. Methods and systems also perform the functions of the apparatus. In one embodiment, the apparatus includes a processor that: determines a reference signal received power corresponding to each beam of multiple beams to result in a set of determined reference signal received powers; orders the set of determined reference signal received powers in descending order to result in an ordered list of reference signal received powers; and encodes a difference between each two adjacent reference signal received powers of the ordered list of reference signal received powers to result in an encoded ordered list of reference signal received powers.

In one embodiment, the processor uses variable length encoding to encode the difference between each two adjacent reference signal received powers of the ordered list of reference signal received powers. In a further embodiment, using the variable length encoding includes concatenating one or more fixed length units together to form a variable length structure, each unit of the one or more fixed length units includes one or more value bits and a last bit, the one or more value bits indicate at least a portion of an encoded value, and the last bit indicates whether an additional unit follows the respective unit.

In certain embodiments, using the variable length encoding includes concatenating length indication bits with an encoded value to form a variable length structure, the length indication bits indicate a length of the encoded value, and the encoded value is a binary value having a number of bits indicated by the length. In various embodiments, the processor reduces the ordered list of reference signal received powers to reference signal received powers greater than a predetermined threshold reference signal received power.

In some embodiments, the apparatus includes a receiver that receives information indicating a relative transmission power between channel state information reference signal resources and synchronization signal blocks. In one embodiment, the information indicating the relative transmission power between the channel state information reference signal resources and the synchronization signal blocks includes a power offset between the channel state information reference signal resources and the synchronization signal blocks. In a further embodiment, the information indicating the relative transmission power between the channel state information reference signal resources and the synchronization signal blocks includes a first power offset between the channel state information reference signal resources and a shared data channel, and a second power offset between the synchronization signal blocks and the shared data channel. In certain embodiments, the relative transmission power between the channel state information reference signal resources and the synchronization signal blocks is used to compensate for reference signal received powers of the synchronization signal blocks before the reference signal received powers of the synchronization signal blocks are compared to reference signal received powers of the channel state information reference signal resources.

In various embodiments, the processor indicates a position of synchronization signal blocks with respect to channel state information reference signal resources in the encoded ordered list of reference signal received powers. In some embodiments, the processor uses a reference signal received power indicator to indicate a relative position of the synchronization signal blocks with respect to the channel state information reference signal resources in the encoded ordered list of reference signal received powers. In a further embodiment, the processor orders reference signal received powers corresponding to channel state information reference signal resources and synchronization signal blocks together in a same list.

In certain embodiments, the processor uses a reference signal received power indicator to indicate a relative position of adjacent reference signal received powers in the ordered list of reference signal received powers. In various embodiments, the apparatus includes a transmitter that transmits the encoded set of reference signal received powers. In some embodiments, the multiple beams include channel state information reference signal beams, synchronization signal block beams, or a combination thereof.

A method for encoding reference signal received powers, in one embodiment, includes determining a reference signal received power corresponding to each beam of multiple beams to result in a set of determined reference signal received powers. In various embodiments, the method includes ordering the set of determined reference signal received powers in descending order to result in an ordered list of reference signal received powers. In some embodiments, the method includes encoding a difference between each two adjacent reference signal received powers of the ordered list of reference signal received powers to result in an encoded ordered list of reference signal received powers.

In one embodiment, an apparatus for receiving encoded reference signal received powers includes a receiver that receives an encoded ordered list of reference signal received powers, wherein: the encoded ordered list of reference signal received powers is formed by encoding a difference between each two adjacent reference signal received powers of an ordered list of reference signal received powers; the ordered list of reference signal received powers is formed by ordering a set of determined reference signal received powers in descending order; and the set of determined reference signal received powers is formed by determining a reference signal received power corresponding to each beam of multiple beams.

In one embodiment, encoding the difference between each two adjacent reference signal received powers of the ordered list of reference signal received powers includes using variable length encoding to encode the difference between each two adjacent reference signal received powers of the ordered list of reference signal received powers. In a further embodiment, using the variable length encoding includes concatenating one or more fixed length units together to form a variable length structure, each unit of the one or more fixed length units includes one or more value bits and a last bit, the one or more value bits indicate at least a portion of an encoded value, and the last bit indicates whether an additional unit follows the respective unit.

In certain embodiments, using the variable length encoding includes concatenating length indication bits with an encoded value to form a variable length structure, the length indication bits indicate a length of the encoded value, and the encoded value is a binary value having a number of bits indicated by the length. In various embodiments, the apparatus includes a transmitter that transmits information indicating a relative transmission power between channel state information reference signal resources and synchronization signal blocks.

In some embodiments, the information indicating the relative transmission power between the channel state information reference signal resources and the synchronization signal blocks includes a power offset between the channel state information reference signal resources and the synchronization signal blocks. In one embodiment, the information indicating the relative transmission power between the channel state information reference signal resources and the synchronization signal blocks includes a first power offset between the channel state information reference signal resources and a shared data channel, and a second power offset between the synchronization signal blocks and the shared data channel. In a further embodiment, the relative transmission power between the channel state information reference signal resources and the synchronization signal blocks is used to compensate for reference signal received powers of the synchronization signal blocks before the reference signal received powers of the synchronization signal blocks are compared to reference signal received powers of the channel state information reference signal resources. In certain embodiments, the multiple beams include channel state information reference signal beams, synchronization signal block beams, or a combination thereof.

A method for receiving encoded reference signal received powers, in one embodiment, includes receiving an encoded ordered list of reference signal received powers, wherein: the encoded ordered list of reference signal received powers is formed by encoding a difference between each two adjacent reference signal received powers of an ordered list of reference signal received powers; the ordered list of reference signal received powers is formed by ordering a set of determined reference signal received powers in descending order; and the set of determined reference signal received powers is formed by determining a reference signal received power corresponding to each beam of multiple beams.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
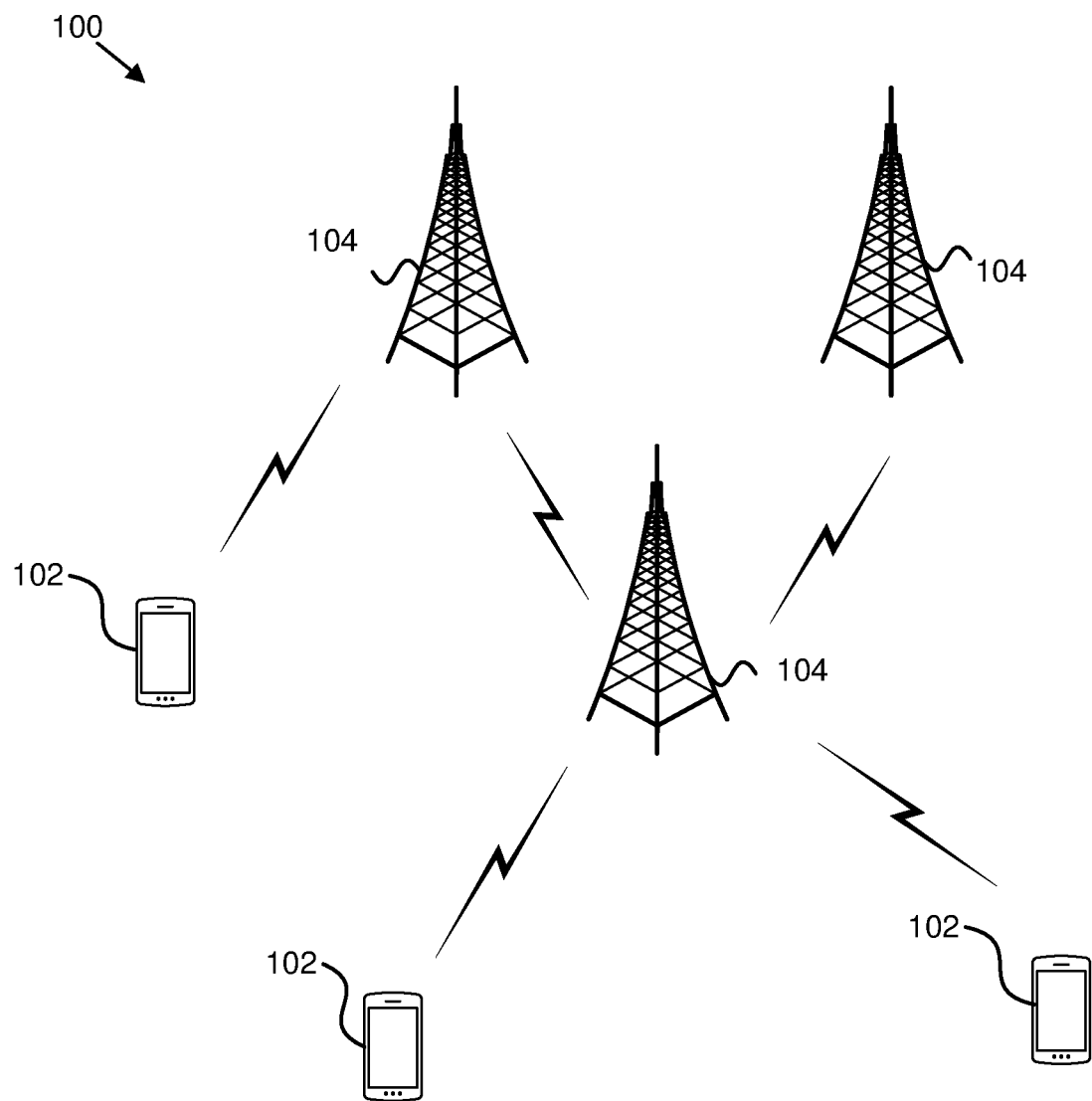
FIG. 1 is a schematic block diagram illustrating one embodiment of a wireless communication system for encoding reference signal received powers.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for encoding reference signal received powers. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine a reference signal received power corresponding to each beam of multiple beams to result in a set of determined reference signal received powers. In various embodiments, the remote unit 102 may order the set of determined reference signal received powers in descending order to result in an ordered list of reference signal received powers. In certain embodiments, the remote unit 102 may encode a difference between each two adjacent reference signal received powers of the ordered list of reference signal received powers to result in an encoded ordered list of reference signal received powers. Accordingly, a remote unit 102 may be used for encoding reference signal received powers.

In one embodiment, a base unit 104 may receive an encoded ordered list of reference signal received powers, wherein: the encoded ordered list of reference signal received powers is formed by encoding a difference between each two adjacent reference signal received powers of an ordered list of reference signal received powers; the ordered list of reference signal received powers is formed by ordering a set of determined reference signal received powers in descending order; and the set of determined reference signal received powers is formed by determining a reference signal received power corresponding to each beam of multiple beams. Accordingly, a base unit 104 may be used for receiving encoded reference signal received powers.

Figure 2:
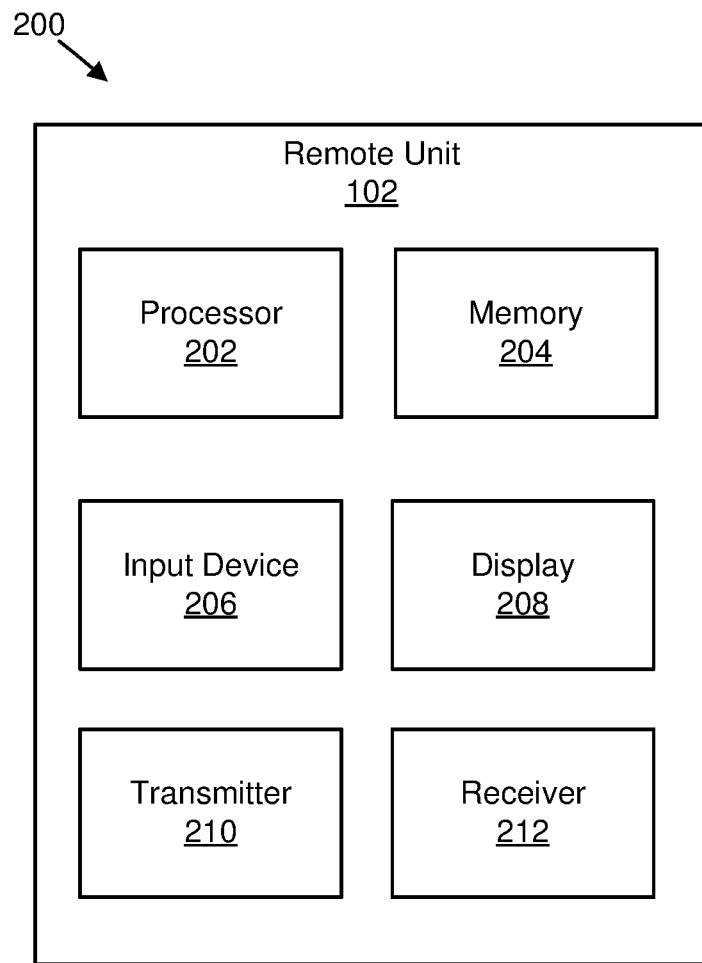
FIG. 2 is a schematic block diagram illustrating one embodiment of an apparatus that may be used for encoding reference signal received powers.

FIG. 2 depicts one embodiment of an apparatus 200 that may be used for encoding reference signal received powers. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a reference signal received power corresponding to each beam of multiple beams to result in a set of determined reference signal received powers. In some embodiments, the processor 202 may order the set of determined reference signal received powers in descending order to result in an ordered list of reference signal received powers. In various embodiments, the processor 202 may encode a difference between each two adjacent reference signal received powers of the ordered list of reference signal received powers to result in an encoded ordered list of reference signal received powers. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In certain embodiments, the apparatus 200 may use various methods to report CSI-RS beams (or SS-block beams) to a base unit 104. In one embodiment, instead of reporting an RSRP of each individual CSI-RS beam or SS-block beam, the apparatus 200, by use of the processor 202, may encode the differences between RSRPs of the CSI-RS beams (or SS-block beams) and report the differences using the transmitter 210. In such an embodiment, a distribution of these differences between RSRPs may be within a small range and may be encoded with fewer bits than the actual RSRPs of the CSI-RS beams. For example, in some embodiments, a remote unit 102 may be configured with 16 CSI-RS beams, and the RSRP of a beam may be uniformly distributed in a range from −44 decibel-milliwatts ("dBm") to −140 dBm. In such an example, the top 8 beams may be reported. After ranking the CSI-RS beams with respect to their RSRP in descending order, most of the differential RSRP may be very small and may be encoded with just a few bits. As described herein, differential encoding schemes may take advantage of this and encode the differential RSRPs with less overhead (e.g., number of transmission bits) than reporting without differential encoding.

One embodiment of a differential encoding scheme that may be performed by the processor 202 may include the following three elements. In a first element, a minimum RSRP threshold ("RSRPmin") may be configured by a base unit 104. The RSRPmin may be configured using signaling (e.g., RRC signaling) or may be preconfigured (e.g., defined in a specification). In certain embodiments, a CSI-RS beam may only be useful and/or reported if it has a RSRP greater than or equal to the RSRPmin. In such embodiments, the apparatus 200 may include a CSI-RS beam in its report to a base unit 104 only if the RSRP of the CSI-RS beam is greater than or equal to the RSRPmin. In response to a number of CSI-RS beams meeting this minimum threshold being larger than Q (a configured number of TX beams to report), the processor 202 may choose the Q strongest CSI-RS beams to report.

In a second element, the processor 202 may sort the Q strongest CSI-RS beams in descending order of their RSRPs (e.g., the highest RSRP is first in the list and the lowest RSRP is last in the list). In some embodiments, the Q strongest CSI-RS beams may be sorted in ascending order of their RSRPs (e.g., the lowest RSRP is first in the list and the highest RSRP is last in the list). In certain embodiments, this may generate a list L1, such as the following: L1={{ID_CSI-RS_beam$_1$, RSRP_CSI-RS_beam$_1$}, {ID_CSI-RS_beam$_2$, RSRP_CSI-RS_beam$_2$}, . . . , {ID_CSI-RS_beam$_q$, RSRP_CSI-RS_beam$_q$}}, where RSRP_CSI-RS_beam$_1 \geq$ RSRP_CSI-RS_beam$_2 \geq$ . . . $\geq$ RSRP_CSI-RS_beam$_q$, and q$\leq$Q. As may be appreciated, ID_CSI-RS is an identification corresponding to a particular CSI-RS, and RSRP_CSI-RS is an RSRP corresponding to a particular CSI-RS.

In a third element, the processor 202 may derive a list L2 of differential RSRPs from the list L1, such as the following: L2={{ID_CSI-RS_beam$_1$, $\Delta$RSRP_CSI-RS_beam$_1$}, {ID_CSI-RS_beam$_2$, $\Delta$RSRP_CSI-RS_beam$_2$}, . . . , {ID_CSI-RS_beam$_q$, $\Delta$RSRP_CSI-RS_beam$_q$}}, where a differential RSRP may be defined as: $\Delta$RSRP_CSI-RS_beam$_1$=RSRP$_{max}$−RSRP_CSI-RS_beam$_1$, $\Delta$RSRP_CSI-RS_beam$_k$=RSRP_CSI-RS_beam$_{k-1}$−RSRP_CSI-RS_beam$_k$, $\Delta$RSRP_CSI-RS_beam$_k \geq$0, 2$\leq$k$\leq$q, and RSRP$_{max}$ is a maximum RSRP. The list L2 may stay in descending order. As may be appreciated, the above three elements may apply to SS-block beams in addition to the CSI-RS beams.

In certain embodiments, the range of differential RSRP may be smaller than 97 dBm and may use fewer bits to encode than a non-differential RSRP. For example, in one embodiment, non-differential RSRP may use 7 bits, while differential RSRP may use less than 7 bits. In some embodiments, variable length encoding may be used to encode the differential RSRP (e.g., $\Delta$RSRP_CSI-RS_beam$_k$) in order to reduce the number of bits used.

In a first embodiment of variable length encoding, a unit ("vUnit") of N$_{VC}$ bits (e.g., each unit has a fixed length, each unit has a fixed number of bits) may be defined as a unit of encoding. The vUnit includes one or more value bits that indicate at least a portion of an encoded value and a last bit. In such an embodiment, the last bit of the vUnit is used as an "end-of-word" indicator to indicate whether it is the last vUnit. In response to the end-of-word indicator being 1, there are no more vUnits used for the encoded value. In response to the end-of-word indicator being 0, there will be at least one more vUnit after the current vUnit. Each vUnit has (N$_{VC}$−1) bits that may be used as a portion of the encoded value. For a variable length structure with K vUnits, there are total of K*(N$_{VC}$−1) bits used to encode the value ("v"). The binary representation of v is carried in these K*(N$_{VC}$−1) bits as illustrated in Table 1.

The examples of Table 1 use an N$_{VC}$=3. In one example, if the value to be encoded is 1 and N$_{VC}$=3, only one bit is needed to have a binary representation of 1 out of two value bits available for a binary representation of "01," so only one vUnit is used with the third bit being "1" to have a concatenated variable length structure of "011." As another example, if the value to be encoded is 8 and N$_{VC}$=3, four bits are needed to have a binary representation of 8, so two vUnits are used with the third bit being "1" in the second vUnit to have a concatenated variable length structure of "100001" in which the third and sixth bits are last bits of the two vUnits and the first, second, fourth, and fifth bits "1000" are a binary representation of the value 8. Other examples are also illustrated in Table 1.

TABLE 1

| Value | Variable Length Structure |
|---|---|
| 1 | 011 |
| 4 | 010001 |
| 8 | 100001 |
| 30 | 010110101 |
| 87 | 010010010111 |

In a second embodiment of variable length encoding, length indication bits are concatenated with an encoded value. In such an embodiment, the length indication bits may be the first two ("N$_i$") bits ("b$_0$b$_1$") and are used to indicate a length of the encoded value that is a positive integer "v" defined as 0$\leq$v$\leq$127. Table 2 illustrates one embodiment of the length of the encoded value based on the bits b$_0$b$_1$.

TABLE 2

| b$_0$b$_1$ | Range of v | Number of Bits Used to Encode v (N$_e$) | Total Number of Bits (N$_e$ + N$_i$) |
|---|---|---|---|
| 00 | 0 $\leq$ v $\leq$ 1 | 1 | 3 |
| 01 | 2 $\leq$ v $\leq$ 7 | 3 | 5 |
| 10 | 8 $\leq$ v $\leq$ 15 | 4 | 6 |
| 11 | 15 $\leq$ v $\leq$ 127 | 7 | 9 |

In this embodiment of variable length encoding, the encoded value bits following b$_0$b$_1$ with the corresponding length are used to encode the value v. Table 3 illustrates various examples of this variable length encoding embodiment.

TABLE 3

| Value | b$_0$b$_1$ | Variable Length Structure |
|---|---|---|
| 1 | 00 | 001 |
| 4 | 01 | 01100 |
| 8 | 10 | 101000 |
| 30 | 11 | 110011110 |
| 87 | 11 | 111010111 |

In certain embodiments, other values of Ni, or other encoded ranges of v (e.g., corresponding to different $b_0 \ldots b_{Ni-1}$), may be used. Because the difference between two adjacent RSRP values in a sorted list is smaller than the full RSRP, differential encoding may reduce reporting overhead. As shown in Table 4, differential reporting schemes with both the first and second embodiments of variable length encoding reduce reporting overhead significantly (30.9% and 28.4% respectively) after 10,000 rounds of simulation.

TABLE 4

|  | First Embodiment of Variable Length Encoding | Second Embodiment of Variable Length Encoding | Fixed Length Encoding |
| --- | --- | --- | --- |
| Average # of Bits Per Beam (overhead reduction) | 4.84 (30.9%) | 5.01 (28.4%) | 7 (0%) |

In various embodiments, for the apparatus 200 in a connected state (e.g., RRC_CONNECTED), the apparatus 200 may measure RSRP of both SS-blocks and CSI-RS beams. In such embodiments, the apparatus 200 may use the processor 202 to compare the received RSRP of a SS-block and a CSI-RS beam and may choose to report one or both of them to a base unit 104. Accordingly, in certain embodiments, a power offset between CSI-RS and SS-block may be signaled to the apparatus 200 in order for the apparatus 200 to compare and/or report the RSRP of CSI-RS and SS-blocks.

In some embodiments, when a CSI-RS resource configuration (possibly with multiple ports and including time, frequency, and/or sequence information) is transmitted to the apparatus 200 by signaling (e.g., RRC signaling) from a base unit 104, the CSI-RS TX power per port may also be included. The CSI-RS TX power per port may be transmitted as a first power offset ("Pc") determined as a difference between the CSI-RS TX power and the TX power of PDSCH. The base unit 104 may also transmit a second power offset ("Pd") determined as a difference between the TX power of SS-blocks and the TX power of PDSCH. In such embodiments, the apparatus 200 may derive the power offset between a TX power of a CSI-RS and a TX power of an SS-block as Pc-Pd dB.

In certain embodiments, the base unit 104 may transmit a total power offset ("Pe") determined as a difference between a TX power of a CSI-RS port and a TX power of an SS-block directly using signaling (e.g., RRC signaling). In such embodiments, the power offset Pe may be separate from the power offset Pc between the CSI-RS TX power and the TX power of PDSCH.

In various embodiments, the apparatus 200 may report the RSRP of the selected SS-blocks without explicitly reporting the RSRP. In such embodiments, the RSRP of reported CSI-RS signals may be used as references to report the differential RSRPs of SS-blocks instead of reporting the absolute RSRP of the SS-blocks.

In one embodiment, based on a CSI-RS RSRP report, the apparatus 200 may report RSRP of SS-blocks explicitly or implicitly. In certain embodiments, in response to the power offset (e.g., either Pe or Pc-Pd) not being 0 dB, the RSRP of SS-blocks may be adjusted for Pe before being compared to CSI-RS RSRP and reported to a base unit 104. As used herein, an RSRP measurement of an SS-block k ("RSRP_SS_block$_k$") refers to an RSRP after adjustment for the power offset. In various embodiments, a RSRP$_{max}$ reported is −44 dBm. In various embodiments, selected SS-blocks (e.g., SS-blocks greater than or equal to RSRPmin) may be sorted in descending order of RSRP (e.g., a first listed SS-block in the list has the highest RSRP and a last listed SS-block in the list has the lowest RSRP).

For example, suppose a number $q_{ss}$ of SS-blocks are selected for reporting, and $q_{ss} \leq Q_{ss}$ ($Q_{ss}$ is a maximum number of SS blocks to report), the RSRPs of the SS-blocks may be reported relative to reported CSI-RS as follows: {{Index_SS_block$_1$, Ref_CSI-RS_beam$_1$, RSRP_Indicaton}, {Index_SS_block$_2$, Ref_CSI-RS_beam$_2$, RSRP_Indicator$_2$}, . . . , {Index_SS_block$_{qss}$, Ref_CSI-RS_beam$_{qss}$, RSRP_Indicator$_{qss}$}}. The index of an SS-block may be its time (e.g., slot) index in an SS burst set. For SS_block$_k$, Ref_CSI-RS_beam$_k$ is the CSI-RS beam with the closest RSRP. (RSRP(Ref_CSI-RS_beam$_{k-1}$)+RSRP(Ref_CSI-RS_beam$_k$))/2≥RSRP_SS_block$_k$>(RSRP(Ref_CSI-RS_beam$_k$)+RSRP(Ref_CSI-RS_beam$_{k+1}$))/2, and RSRP_Indicator$_k$=1 if RSRP_SS_block$_k$≥RSRP(Ref_CSI-RS_beam$_k$), and RSRP_Indicator$_{qss}$=0 if RSRP(Ref_CSI-RS_beam$_k$))>RSRP_SS_block$_k$. As used herein, the field RSRP_Indicator$_k$ uses 1 bit to indicate whether RSRP_SS_block$_k$ is higher or lower than the RSRP of the reference CSI-RS beam. Certain embodiments may not use the field RSRP_Indicator$_k$.

In some embodiments, Ref_CSI-RS_beam$_0$ indicates a maximum reported RSRP value with Ref_CSI-RS_beam$_0$=−44 dBm (or another value), and Ref_CSI-RS_beam$_{qss+1}$ indicates a threshold RSRP value RSRP$_{min}$. Accordingly, an SS-block beam with an RSRP higher than a strongest reported CSI-RS, or an RSRP weaker than a weakest reported CSI-RS may be reported. As described above, SS block RSRPs relative to reported CSI-RS beam RSRPs may be reported and sufficient information may be provided to a base unit 104 to determine which beam to use for DL transmissions to the apparatus 200.

For example, if the list of reported CSI-RS has the following RSRP: {(CSI-RS1, −50 dBm), (CSI-RS2, −70 dBm), (CSI-RS3, −100 dBm), (CSI-RS4, −120 dBm)}, and the SS-blocks are {(SS-blk1, −56 dBm), (SS-blk2, −95 dBm)}, the SS-blocks may be reported as follows: {(SS-blk1, CSI-RS1, 0), (SS-blk2, CSI-RS3, 1)}.

Overhead used by the above embodiments for reporting RSRP of the SS-blocks is illustrated in the following formula description and in Table 5 as "Option 1." If M=⌈log$_2$ (Q+1)⌉, a number of bits used to indicate {Ref_CSI-RS_beam$_k$, RSRP_Indicator$_k$} is M+1 (or M if RSRP_Indicator$_k$ is not used). Moreover, a total number of bits to indicate a relative RSRP of the Qss beams is (M+1)*Qss besides indices of the reported SS-blocks. For example, if Q=3 (e.g., up to 3 CSI-RS ports are reported) and Qss=3 (e.g., up to 3 SS blocks may be reported), a number of bits to indicate the relative RSRP of the SS blocks, in addition to the RSRP of CSI-RS and the beam ID/indices of the reported CSI-RS and SS-blocks, is 9 (e.g., 3 times 3).

In certain embodiments, signaling the relative RSRP of reported SS-blocks may be performed by including and ranking all reported CSI-RS beams and SS-blocks together in the same list in descending (or equivalently ascending) order. In such embodiments, a bit may be used to indicate the type of RS (e.g., CSI-RS or SS-block), but there may be no need to indicate a Ref_CSI-RS_beam for SS-blocks because any references are already imbedded in the relative positions of the SS-blocks with respect to the reported CSI-RS beams. The combined list of CSI-RS and SS-block report may have the following format: {{RS_type$_1$,{CSI-RS_report$_1$ or >SS-block_report$_1$ depending on the RS_type$_1$}}, . . . {RS_type$_{q+qss}$,{CSI-RS_report$_{q+qss}$ or SS-block_report$_{q+qss}$ depending on the RS_type$_{q+qss}$}}} where CSI-RS_report$_k$={ID_CSI-RS_beam$_k$, ΔRSRP_CSI-RS_beam$_k$} as described above, and SS-block_report$_k$={Index_SS_block$_k$, SS-block_RSRP_Indicator$_k$} where SS-block_RSRP_Indicator$_k$=1 if SS_block$_k$ is closer to the beam to its left, and SS-block_RSRP_Indicator$_k$=0 if SS_block$_k$ closer to the beam to the right. The beam to the left or right of SS_block$_k$ may be either CSI-RS beam or SS-block beam. In some embodiments, the RSRP_Indicator may not be used.

For example, if the list of reported CSI-RS has the following RSRP: {(CSI-RS1, −50 dBm), (CSI-RS2, −70 dBm), (CSI-RS3, −100 dBm), (CSI-RS4, −120 dBm)}, and the SS-blocks are {(SS-blk1, −56 dBm), (SS-blk2, −95 dBm)}, a combined list of CSI-RS and SS-block beams can be reported as follows: {(CSI-RS, CSI-RS1, −50 dBm), ((SS, SS-blk1, 1)), (CSI-RS2, −70 dBm), (SS, SS-blk2, 0), (CSI-RS3, −100 dBm), (CSI-RS4, −120 dBm)}.

Overhead used by the above embodiments for reporting RSRP of the SS-blocks is illustrated in the following formula description and in Table 5 as "Option 2." One bit is used to indicate the RS type for every CSI-RS or SS-block beam, and 1 bit is used to indicate the relative strength of a SS-block relative to its two nearest CSI-RS neighbors in the list. The total number of bits to indicate the relative RSRP of the Qss SS-blocks are: (Q+2*Qss). For example, if Q=3 and Qss=3, 9 bits are used. As can be seen from Table 5, Option 1 incurs less overhead than Option 2 when $\lceil \log_2(Q+1) \rceil$*Qss<Q+Qss.

TABLE 5

| Reporting Method | Option 1 | Option 2 |
|---|---|---|
| Overhead to Indicate Relative RSRP of SS-blocks with SS-block_RSRP_Indicator (bits) | $\lceil \log_2(Q + 1) + 1 \rceil$ * Qss | Q + 2 * Qss |
| Overhead to Indicate Relative RSRP of SS-blocks Without SS-block_RSRP_Indicator (bits) | $\lceil \log_2(Q + 1) \rceil$ * Qss | Q + Qss |

Figure 3:
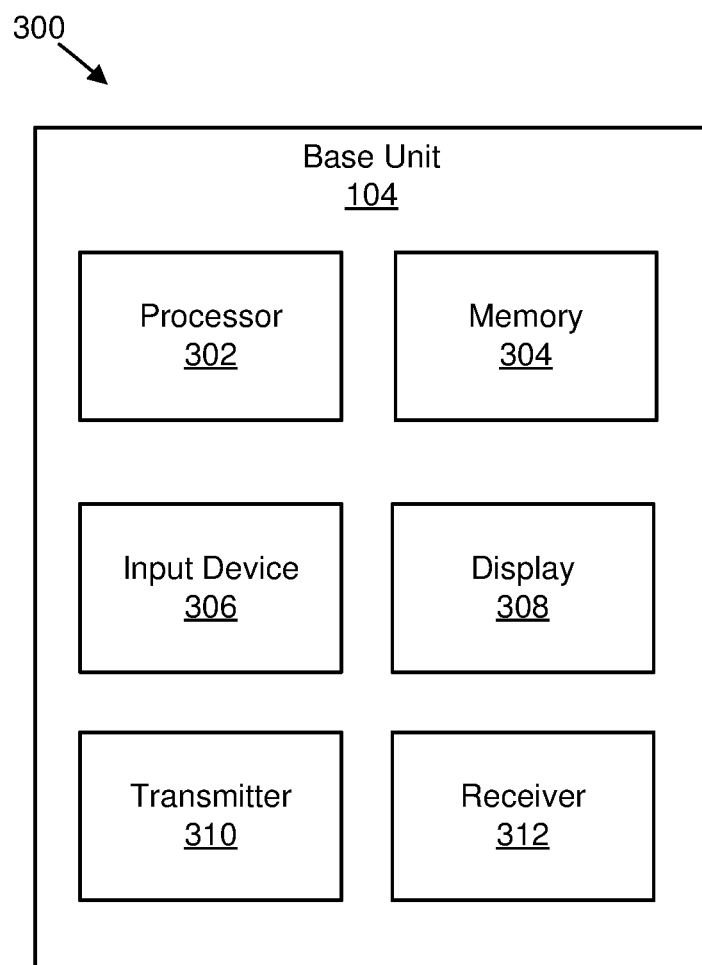
FIG. 3 is a schematic block diagram illustrating one embodiment of an apparatus that may be used for receiving encoded reference signal received powers.

FIG. 3 depicts one embodiment of an apparatus 300 that may be used for receiving encoded reference signal received powers. The apparatus 300 includes one embodiment of the base unit 104 and/or an aerial server. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive an encoded ordered list of reference signal received powers, wherein: the encoded ordered list of reference signal received powers is formed by encoding a difference between each two adjacent reference signal received powers of an ordered list of reference signal received powers; the ordered list of reference signal received powers is formed by ordering a set of determined reference signal received powers in descending order; and the set of determined reference signal received powers is formed by determining a reference signal received power corresponding to each beam of multiple beams. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
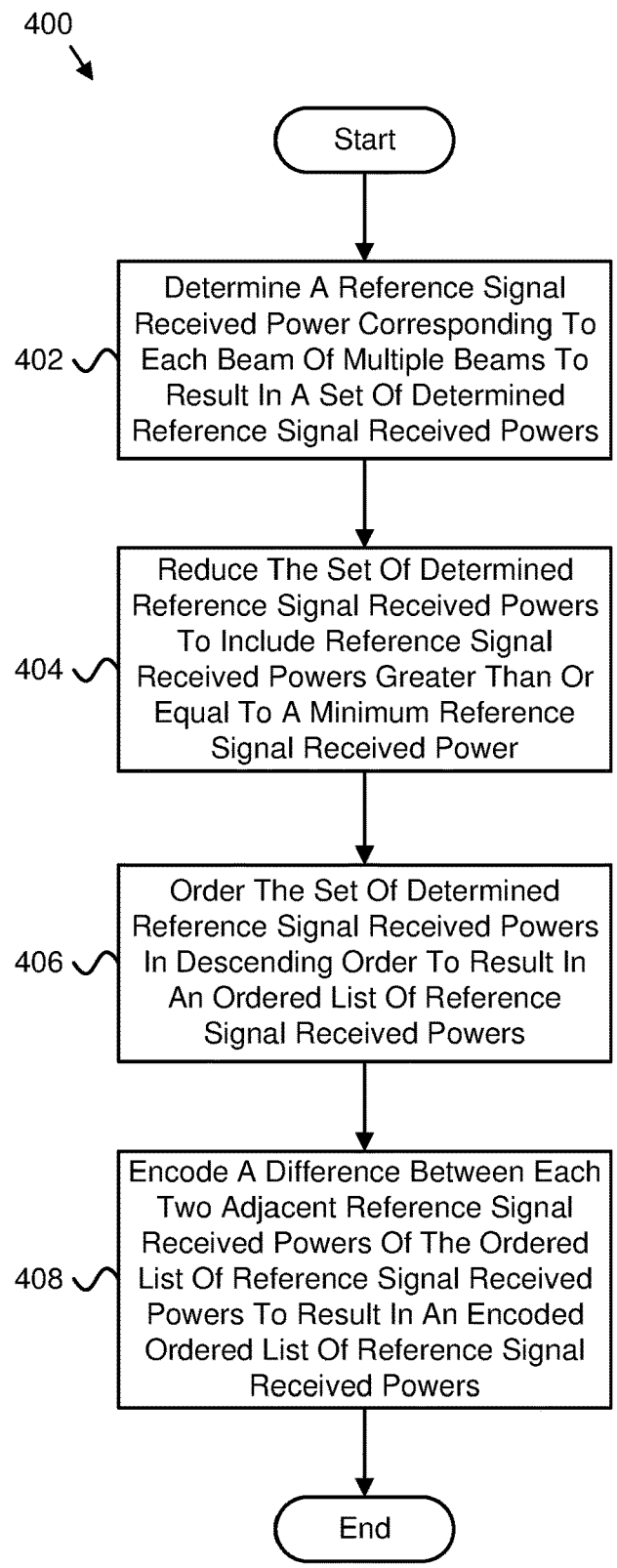
FIG. 4 is a schematic flow chart diagram illustrating one embodiment of a method for encoding reference signal received powers.

FIG. 4 is a schematic flow chart diagram illustrating one embodiment of a method 400 for encoding reference signal received powers. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 a reference signal received power corresponding to each beam of multiple beams to result in a set of determined reference signal received powers. In certain embodiments, the method 400 includes reducing 404 the set of determined reference signal received powers to only include reference signal received powers greater than or equal to a minimum reference signal received power (e.g., RSRPmin). In various embodiments, the method 400 includes ordering 406 the set of determined reference signal received powers in descending order to result in an ordered list of reference signal received powers. In some embodiments, the method 400 includes encoding 408 a difference between each two adjacent reference signal received powers of the ordered list of reference signal received powers to result in an encoded ordered list of reference signal received powers.

In one embodiment, method 400 includes using variable length encoding to encode the difference between each two adjacent reference signal received powers of the ordered list of reference signal received powers. In a further embodiment, using the variable length encoding includes concatenating one or more fixed length units together to form a variable length structure, each unit of the one or more fixed length units includes one or more value bits and a last bit, the one or more value bits indicate at least a portion of an encoded value, and the last bit indicates whether an additional unit follows the respective unit.

In certain embodiments, using the variable length encoding includes concatenating length indication bits with an encoded value to form a variable length structure, the length indication bits indicate a length of the encoded value, and the encoded value is a binary value having a number of bits indicated by the length. In various embodiments, the method 400 includes reducing the ordered list of reference signal received powers to reference signal received powers greater than a predetermined threshold reference signal received power.

In some embodiments, method 400 includes receiving information indicating a relative transmission power between channel state information reference signal resources and synchronization signal blocks. In one embodiment, the information indicating the relative transmission power between the channel state information reference signal resources and the synchronization signal blocks includes a power offset between the channel state information reference signal resources and the synchronization signal blocks. In a further embodiment, the information indicating the relative transmission power between the channel state information reference signal resources and the synchronization signal blocks includes a first power offset between the channel state information reference signal resources and a shared data channel, and a second power offset between the synchronization signal blocks and the shared data channel. In certain embodiments, the relative transmission power between the channel state information reference signal resources and the synchronization signal blocks is used to compensate for reference signal received powers of the synchronization signal blocks before the reference signal received powers of the synchronization signal blocks are compared to reference signal received powers of the channel state information reference signal resources.

In various embodiments, the method 400 includes indicating a position of synchronization signal blocks with respect to channel state information reference signal resources in the encoded ordered list of reference signal received powers. In some embodiments, the method 400 includes using a reference signal received power indicator to indicate a relative position of the synchronization signal blocks with respect to the channel state information reference signal resources in the encoded ordered list of reference signal received powers. In a further embodiment, the method 400 includes ordering reference signal received powers corresponding to channel state information reference signal resources and synchronization signal blocks together in a same list.

In certain embodiments, the method 400 includes using a reference signal received power indicator to indicate a relative position of adjacent reference signal received powers in the ordered list of reference signal received powers. In various embodiments, the method 400 includes transmitting the encoded set of reference signal received powers. In some embodiments, the multiple beams include channel state information reference signal beams, synchronization signal block beams, or a combination thereof.

Figure 5:
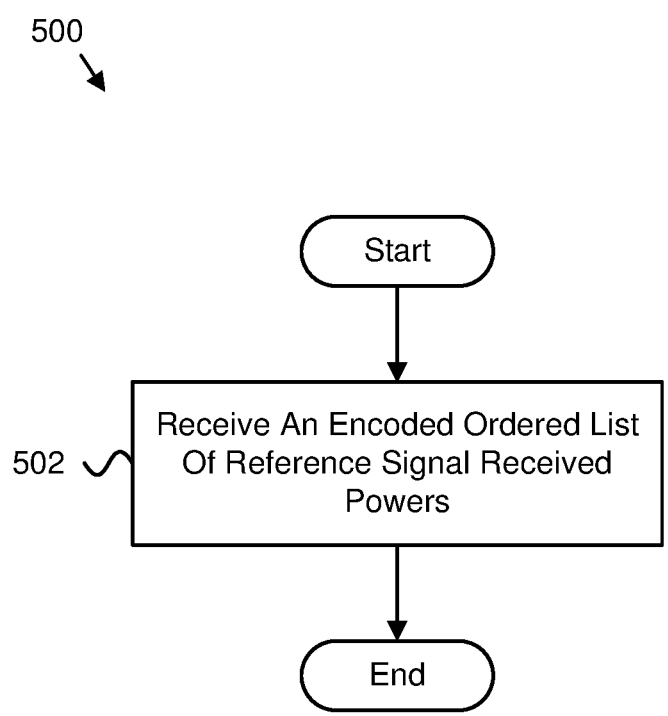
FIG. 5 is a schematic flow chart diagram illustrating one embodiment of a method for receiving encoded reference signal received powers.

FIG. 5 is a schematic flow chart diagram illustrating one embodiment of a method 500 for receiving encoded reference signal received powers. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include receiving 500 an encoded ordered list of reference signal received powers, wherein: the encoded ordered list of reference signal received powers is formed by encoding a difference between each two adjacent reference signal received powers of an ordered list of reference signal received powers; the ordered list of reference signal received powers is formed by ordering a set of determined reference signal received powers in descending order; and the set of determined reference signal received powers is formed by determining a reference signal received power corresponding to each beam of multiple beams.

In one embodiment, encoding the difference between each two adjacent reference signal received powers of the ordered list of reference signal received powers includes using variable length encoding to encode the difference between each two adjacent reference signal received powers of the ordered list of reference signal received powers. In a further embodiment, using the variable length encoding includes concatenating one or more fixed length units together to form a variable length structure, each unit of the one or more fixed length units includes one or more value bits and a last bit, the one or more value bits indicate at least a portion of an encoded value, and the last bit indicates whether an additional unit follows the respective unit.

In certain embodiments, using the variable length encoding includes concatenating length indication bits with an encoded value to form a variable length structure, the length indication bits indicate a length of the encoded value, and the encoded value is a binary value having a number of bits indicated by the length. In various embodiments, the method 500 includes transmitting information indicating a relative transmission power between channel state information reference signal resources and synchronization signal blocks.

In some embodiments, the information indicating the relative transmission power between the channel state information reference signal resources and the synchronization signal blocks includes a power offset between the channel state information reference signal resources and the synchronization signal blocks. In one embodiment, the information indicating the relative transmission power between the channel state information reference signal resources and the synchronization signal blocks includes a first power offset between the channel state information reference signal resources and a shared data channel, and a second power offset between the synchronization signal blocks and the shared data channel. In a further embodiment, the relative transmission power between the channel state information reference signal resources and the synchronization signal blocks is used to compensate for reference signal received powers of the synchronization signal blocks before the reference signal received powers of the synchronization signal blocks are compared to reference signal received powers of the channel state information reference signal resources. In certain embodiments, the multiple beams include channel state information reference signal beams, synchronization signal block beams, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    determining a reference signal received power corresponding to each beam of a plurality of beams to result in a set of determined reference signal received powers;
    ordering the set of determined reference signal received powers in descending order to result in an ordered list of reference signal received powers;
    encoding a difference between each two adjacent reference signal received powers of the ordered list of reference signal received powers using variable length encoding to encode the difference between each two adjacent reference signal received powers of the ordered list of reference signal received powers to result in an encoded ordered list of reference signal received powers, wherein each encoded reference signal received power of the encoded ordered list of reference signal received powers is a difference between two different reference signal received powers; and
    transmitting a reference signal received power report, wherein indications of reference signal received power included in the reference signal received power report comprise only the encoded ordered list of reference signal received powers.

2. The method of claim 1, wherein using the variable length encoding comprises concatenating one or more fixed length units together to form a variable length structure, each unit of the one or more fixed length units comprises one or more value bits and a last bit, the one or more value bits indicate at least a portion of an encoded value, and the last bit indicates whether an additional unit follows the respective unit.

3. The method of claim 1, wherein using the variable length encoding comprises concatenating length indication bits with an encoded value to form a variable length structure, the length indication bits indicate a length of the encoded value, and the encoded value is a binary value having a number of bits indicated by the length.

4. The method of claim 1, further comprising reducing the ordered list of reference signal received powers to reference signal received powers greater than a predetermined threshold reference signal received power.

5. The method of claim 1, further comprising receiving information indicating a relative transmission power between channel state information reference signal resources and synchronization signal blocks.

6. The method of claim 5, wherein the information indicating the relative transmission power between the channel state information reference signal resources and the synchronization signal blocks comprises a power offset between the channel state information reference signal resources and the synchronization signal blocks.

7. The method of claim 5, wherein the information indicating the relative transmission power between the channel state information reference signal resources and the synchronization signal blocks comprises a first power offset between the channel state information reference signal resources and a shared data channel, and a second power offset between the synchronization signal blocks and the shared data channel.

8. The method of claim 5, wherein the relative transmission power between the channel state information reference signal resources and the synchronization signal blocks is used to compensate for reference signal received powers of the synchronization signal blocks before the reference signal received powers of the synchronization signal blocks are compared to reference signal received powers of the channel state information reference signal resources.

9. The method of claim 1, further comprising indicating a position of synchronization signal blocks with respect to channel state information reference signal resources in the encoded ordered list of reference signal received powers.

10. The method of claim 9, wherein indicating the position of the synchronization signal blocks with respect to the channel state information reference signal resources in the encoded ordered list of reference signal received powers comprises using a reference signal received power indicator to indicate a relative position of the synchronization signal blocks with respect to the channel state information reference signal resources in the encoded ordered list of reference signal received powers.

11. The method of claim 1, wherein ordering the set of determined reference signal received powers in descending order to result in the ordered list of reference signal received powers comprises ordering reference signal received powers corresponding to channel state information reference signal resources and synchronization signal blocks together in a same list.

12. The method of claim 11, further comprising using a reference signal received power indicator to indicate a relative position of adjacent reference signal received powers in the ordered list of reference signal received powers.

13. The method of claim 1, wherein the plurality of beams comprises channel state information reference signal beams, synchronization signal block beams, or a combination thereof.

14. An apparatus comprising:
a processor that:
determines a reference signal received power corresponding to each beam of a plurality of beams to result in a set of determined reference signal received powers;
orders the set of determined reference signal received powers in descending order to result in an ordered list of reference signal received powers; and
encodes a difference between each two adjacent reference signal received powers of the ordered list of reference signal received powers using variable length encoding to encode the difference between each two adjacent reference signal received powers of the ordered list of reference signal received powers to result in an encoded ordered list of reference signal received powers, wherein and each encoded reference signal received power of the encoded ordered list of reference signal received powers is a difference between two different reference signal received powers; and
a transmitter that transmits a reference signal received power report, wherein indications of reference signal received power included in the reference signal received power report comprise only the encoded ordered list of reference signal received powers.

15. The apparatus of claim 14, wherein the processor using the variable length encoding comprises the processor concatenating one or more fixed length units together to form a variable length structure, each unit of the one or more fixed length units comprises one or more value bits and a last bit, the one or more value bits indicate at least a portion of an encoded value, and the last bit indicates whether an additional unit follows the respective unit.

16. The apparatus of claim 14, wherein the processor using the variable length encoding comprises the processor concatenating length indication bits with an encoded value to form a variable length structure, the length indication bits indicate a length of the encoded value, and the encoded value is a binary value having a number of bits indicated by the length.

17. The apparatus of claim 14, wherein the processor reduces the ordered list of reference signal received powers to reference signal received powers greater than a predetermined threshold reference signal received power.

18. A method comprising:
receiving a reference signal received power report, wherein indications of reference signal received power included in the reference signal received power report comprise only an encoded ordered list of reference signal received powers, wherein:
the encoded ordered list of reference signal received powers is formed by encoding a difference between each two adjacent reference signal received powers of an ordered list of reference signal received powers using variable length encoding to encode the difference between each two adjacent reference signal received powers of the ordered list of reference signal received powers, wherein each encoded reference signal received power of the encoded ordered list of reference signal received powers is a difference between two different reference signal received powers;
the ordered list of reference signal received powers is formed by ordering a set of determined reference signal received powers in descending order; and
the set of determined reference signal received powers is formed by determining a reference signal received power corresponding to each beam of a plurality of beams.

19. The method of claim 18, wherein using the variable length encoding comprises concatenating one or more fixed length units together to form a variable length structure, each unit of the one or more fixed length units comprises one or more value bits and a last bit, the one or more value bits indicate at least a portion of an encoded value, and the last bit indicates whether an additional unit follows the respective unit.

20. The method of claim 18, wherein using the variable length encoding comprises concatenating length indication bits with an encoded value to form a variable length structure, the length indication bits indicate a length of the encoded value, and the encoded value is a binary value having a number of bits indicated by the length.

* * * * *